United States Patent [19]

Miller

[11] 4,246,567
[45] Jan. 20, 1981

[54] DEVICE FOR DETECTING AND INDICATING LOW PRESSURE AND HIGH HEAT IN PNEUMATIC TIRES

[75] Inventor: Donald L. Miller, Horseheads, N.Y.
[73] Assignee: Facet Enterprises, Inc., Tulsa, Okla.
[21] Appl. No.: 59,930
[22] Filed: Jul. 23, 1979
[51] Int. Cl.$^3$ ............................................. B60C 23/06
[52] U.S. Cl. .................................. 340/58; 200/61.23
[58] Field of Search ............ 340/58; 200/61.22, 61.23, 200/61.25

[56] References Cited

U.S. PATENT DOCUMENTS 4,117,452   9/1978   Snyder et al. ......................... 340/58

FOREIGN PATENT DOCUMENTS 2528352   1/1975   Fed. Rep. of Germany ............. 340/58

*Primary Examiner*—Alvin H. Waring
*Attorney, Agent, or Firm*—Remy J. VanOphem

[57] ABSTRACT

A device for detecting and indicating low pressure or excessive heat in a pneumatic tire. A piezoelectric crystal is operatively associated with a temperature expansible member which expands in response to elevated temperatures. The combined dimensions of the piezoelectric crystal and the expansible member are selected so that one surface of the expansible member is a predetermined distance from the inside surface of the tire. Elevated temperatures cause the expansible member to expand and contact the interior surface of the pneumatic tire resulting in the compression of the piezoelectric crystal and the generation of an output signal. Additionally, deflation of the pneumatic tire causes the tire to deflect so that the predetermined spacing between the interior of the tire and the expansible pellet is reduced and the pellet contacts the inside surface of the tire resulting in the generation of an output signal. The output signal is used to actuate a spark gap to warn of an unsafe tire condition.

10 Claims, 2 Drawing Figures

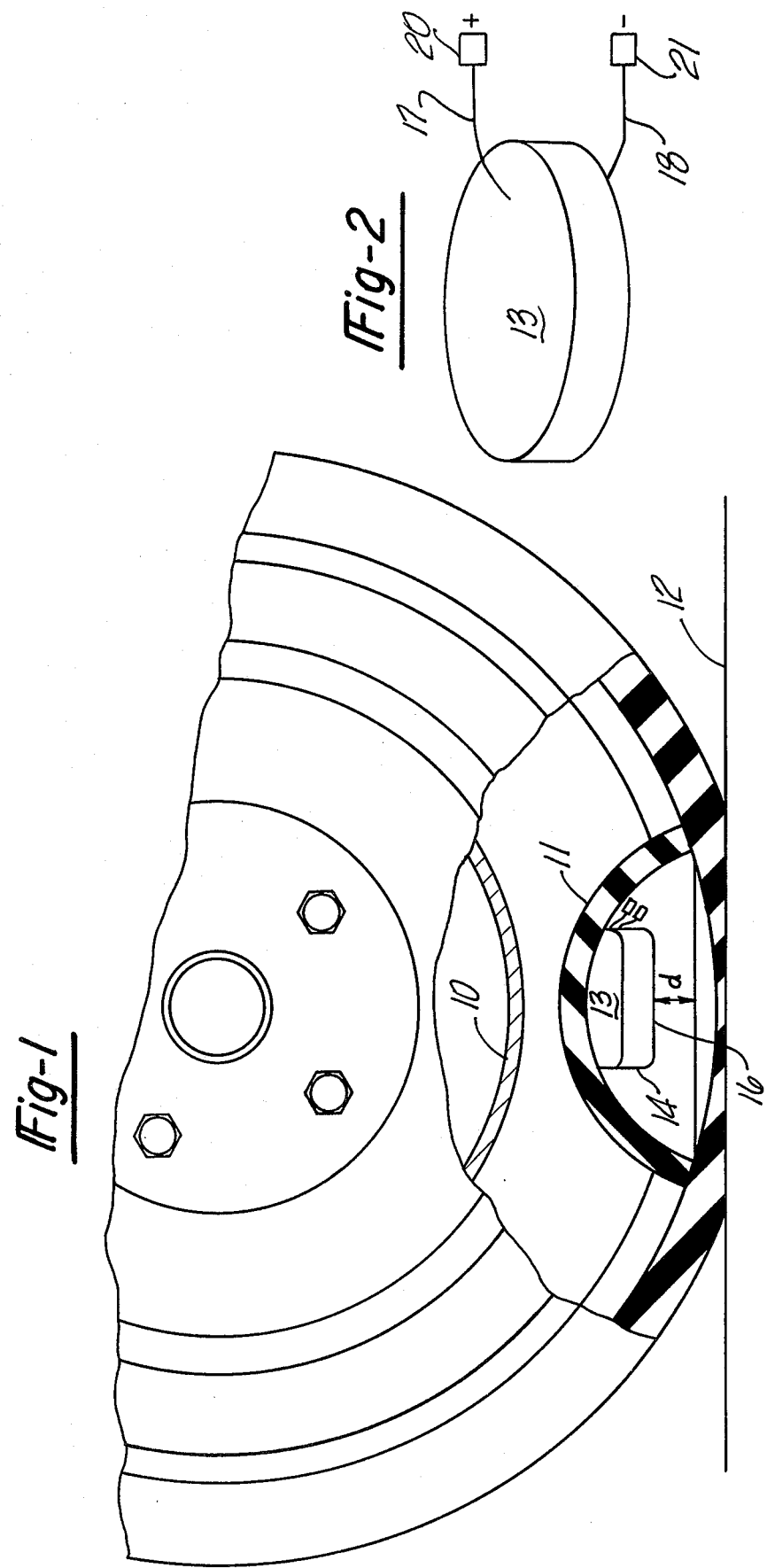

DEVICE FOR DETECTING AND INDICATING LOW PRESSURE AND HIGH HEAT IN PNEUMATIC TIRES

BACKGROUND OF THE INVENTION

The invention relates generally to the detection of fault and failure conditions in vehicle tires and particularly to the detection of overheating, inadequate inflation, and excessive deflation in pneumatic tires for both on and off road vehicles.

Excessive heating, inadequate inflation, and rapid or excessive deflation of pneumatic tires have been long recognized as serious problems with pneumatic tires because the sudden failure of a tire on a moving vehicle, such as a truck or passenger car, gives rise to hazardous circumstances which frequently cause serious accidents and often fatalities. Accordingly, there is a substantial need in the art for a device which will indicate the pending failure of a tire due to either of these causes. The need for such a device has long been recognized in the art as is evidenced by U.S. Pat. No. 4,117,452. This patent discloses a device which is responsive to the deflation of a tire and explains in rather substantial detail the need for such a device. However, the device described in this patent is typical of prior art devices presently available. Typically, the prior art attempts to utilize apparatus and techniques which require special wiring and which also need special transmitters, receivers, and various types of antenna. Furthermore, none of the presently available prior art devices are responsive to all tire failure conditions of excessive temperature, inadequate inflation, or excessive deflation of the pneumatic tire.

It should be understood by those skilled in the art that although the invention is described as being primarily applicable in the art of pneumatic tires, the invention has merit also in any environment in which an inflatable member serves as a load bearing member, the configuration of which is dependent upon either proper inflation or acceptable temperatures.

BRIEF DESCRIPTION OF THE INVENTION

The inventive device yields a hazard indicating signal whenever excessive temperature, inadequate inflation, or rapid deflation of the pneumatic tire give rise to a potential failure in such a tire. The invention is enclosed in a nonconductive flexible dome-like retaining member which supports the invention directly inside the pneumatic tire in a position directly opposite from the surface of the tire which rides on the roadway, that is, the invention is supported near the inside of the tire tread. A piezoelectric crystal is coupled to the support member and an expansible temperature sensitive pellet is coupled to the piezo crystal. The combined dimensions of the piezo crystal and the expansible pellet along a line parallel to a radius of the tire are such that the surface of the pellet is a predetermined distance from the inside surface of the tire tread. As is known, a piezo crystal is an element which yields an output signal when a compressive force is applied thereto. The output signal of the piezo crystal is used to actuate a spark gap so that an electrical spark exists across the gap when the piezo crystal is compressed. Also, as is known, every electrical spark contains radio frequency components which are detectible inside the driver's compartment of the vehicle but which does not require any special wiring or outside connections running from the receiving device to the inventive device.

The invention is responsive to excessive tire temperatures because such temperatures cause the expansible wax pellet to expand inside the tire such that the predetermined distance between the surface of the pellet and the tire decreases. When the expansion of the pellet approximately equals the predetermined distance, the rotation of the tire causes the pellet to apply a compressive force to the piezo crystal each time the invention is directly above the road surface. These impact compressions upon the piezo crystal cause the crystal to generate an output signal which, in turn, fires the spark gap to generate the radio signals which are detected by an appropriate receiver located in the operator's compartment of the vehicle.

Similarly, loss of air, or deflation of the tire, cause a change in the configuration of the tire so that the predetermined distance between the invention and the tire decreases to zero. In this condition the rotation of the tire causes compressive impact forces to be applied to the piezo crystal which then generates the appropriate output signals to fire the spark gap, the r-f components of which are detected within the vehicle compartment. In this manner, an indication of pending tire failure is given in advance of the failure and appropriate corrective action can be taken by the driver to prevent hazardous conditions which ordinarily would arise from the failure.

BRIEF DESCRIPTION OF THE DRAWINGS

FIG. 1 is a preferred embodiment of the invention.

FIG. 2 is a simplified showing of a piezoelectric crystal and the manner of coupling a spark gap to the crystal.

DESCRIPTION OF THE PREFERRED EMBODIMENT

FIG. 1 shows a sectionalized portion of a tire 10 in which the invention is mounted. A nonconductive flexible dome 11 is bonded to the inside surface of the load-bearing portion of the tire. Accordingly, in the position shown in FIG. 1, the inventive device is positioned immediately above the road surface 12 along which the vehicle would be traveling. The dome 11 is made of a nonconductive material so that the material does not interfere with the signal produced by the piezo crystal 13 which is bonded or otherwise coupled to the dome 11. Also, dome 11 is made of a flexible material so that it flexes and deforms in accordance with the deflection and deformation of the tire 10 as it travels along the roadway. However, because of the dome-like configuration of the support member 11, the support is quite substantial and capable of supporting the invention. Bonded or otherwise permanently coupled to piezo crystal 13 is an expansible pellet 14. The pellet 14 can be made of wax or any convenient type of material which will expand in response to heat. Typically, the pellet 14 is made of wax enclosed in a copper case to give the pellet rigidity. However, it is also possible to enclose the expansible material in a nonconductive enclosure if desired. The use of conductive material to enclose the pellet does not affect the operation of the invention because there is no means for the signal generated by the piezoelectric crystal to be grounded. It should be noted that the lexicon of those skilled in the art, the pellet 14 is frequently referred to as a wax power element.

Support dome 11, piezo crystal 13, and nonconductive pellet 14 are dimensioned so that the impact surface 16 of pellet 14 is positioned a predetermined distance "d" from the inside surface of the tire. Accordingly, the combined dimensions of the dome 11, piezoelectric crystal 13, and pellet 14 when measured along a line parallel to a radius of tire 10 are selected so that the impact surface 16 of pellet 14 lies a predetermined distance "d" from the inside surface of the tire tread. Additionally, pellet 14 is dimensioned in accordance with its coefficient of expansion so that it expands a distance approximately equal to the predetermined distance "d" when exposed to temperatures sufficiently elevated to cause damage to the tire. The temperature at which damage can occur in a function of the tire, and thus will vary for different types and makes of tires and will be available from the tire manufacturer. Accordingly, when the temperature of the tire, and thus also the air within the tire and the inventive device, approaches a level which is dangerous to the tire, the expansible pellet 14 expands filling the space "d" causing the tire to impart a compressive force to the piezoelectric crystal 13 through pellet 14 each time the rotation of the tire carries the pellets 14 to a position just opposite the road surface 12.

Also, if the tire 10 should lose air and thereby deflate, the deflation would cause a deflection of the tire so that it would flatten on the load-bearing surface of the tire. When rotation of the tire causes the invention to be nearest the road surface, the gap "d" closes thereby causing the inside of the tire 10 to push upon the impact surface 16 of the pellet 14 thereby applying a compressive force to crystal 13. This compressive force causes the piezo crystal 13 to generate an output signal which is detected to indicate the failure to the vehicle operator.

As shown in FIG. 2, a piezo crystal 13 is shown having output leads 17 and 18. A compressive force applied in the direction of the arrow 19 causes the crystal to generate an output signal which is available as a voltage across the leads 17 and 18. This signal can be used to fire a spark across the spark gap plates 20 and 21. It should be noted that the piezo crystal 13 will generate a voltage irrespective of whether the compressive force is applied in the direction indicated by arrow 19 or in the opposite direction upon the opposite surface of the crystal. The only difference would be the polarity of the signal. However, because a spark gap is used, the polarity of the signal is of no consequence to the inventive system. Also, because the support dome 11 is made of a nonconductive material, the support dome does not interfere with the signal generated by the piezo crystal. The fact that expansible pellet 14 does not contact any conductive member also prevents any interferance with the operation of the invention that signal grounding could otherwise cause. It will be apparent to those skilled in the art that the showing of leads 17 and 18 as well as that of gap plates 20 and 21 is for illustration only and in actual construction these elements will be rigidly constructed and supported. Such physical support is within the purview of those skilled in the art.

As is known to those skilled in the electrical arts, a spark is composed of a static electric charge which contains many frequency components. Some of these frequency components fall within the radio frequency (r-f) range. A receiver of any convenient type which is responsive to a particular and preselected frequency of r-f signal can be positioned in the operator's compartment of the vehicle so that the compressive forces applied to the piezo crystal in response to either elevated temperatures or loss of air within the tire yield a hazard indicating signal to the driver of the vehicle. The warning signal can be in the form of the ringing of a bell or buzzer or a visual indication such as the lighting of a lamp.

It should also be noted that the piezoelectric crystal is compressed each time the dome 11, its supporting crystal 13 and pellet 14 are directly opposite the roadway 12. Obviously, this will happen one time per each revolution of the tire. Accordingly, a spark is generated each time the tire makes one revolution. The indication received in the operator's compartment therefore is available one time for each revolution of the wheel. For this reason, the output response of the invention is directionally proportional to the speed of the vehicle. If desired, this information can be used in various useful manners, such as speed control system or antiskid breaking systems.

I claim:

1. A pressure and temperature responsive device for independently indicating hazardous pressure and temperature changes in an inflatable member comprising:
   support means contained within said inflatable member for supporting said device;
   impact responsive means coupled to said support means for generating an output signal upon impact;
   means for providing a detectable hazard indicative signal in response to said output signal; and
   temperature expansible means affixed to said impact responsive means, said expansible means being dimensioned to establish a predetermined distance between said responsive means and said inflatable member so that a decrease of said predetermined distance causes said expansible means to compress said impact responsive means to generate said output signal.

2. The device of claim 1 wherein said impact responsive means is a piezoelectric crystal.

3. The device of claim 1 wherein said means for providing is a spark gap.

4. The device of claim 1 wherein said temperature expansible means is an expansible pellet in a rigid enclosure.

5. The device of claim 2 wherein said means for providing is a spark gap.

6. The device of claim 2 wherein said temperature responsive means is an expansible pellet in a rigid enclosure.

7. The device of claim 2 wherein said inflatable member is a pneumatic tire, said means for providing is a spark gap, said temperature expansible means is a wax pellet, and said support means is a nonconductive flexible dome coupled to the inside of said tire.

8. The device of claim 3 wherein said hazard indicative signal is a spark having frequency components falling within the radio frequency range.

9. The device of claim 8 wherein said impact responsive means is a piezoelectric crystal and wherein said temperature expansible means is an expansible pellet in a rigid enclosure.

10. The device of claim 8 wherein said inflatable member is a pneumatic tire, said means for providing is a spark gap, said temperature expansible means is a wax pellet, and said support means is a nonconductive flexible dome coupled to the inside of said tire.

* * * * *

UNITED STATES PATENT AND TRADEMARK OFFICE
CERTIFICATE OF CORRECTION

PATENT NO. : 4,246,567
DATED : January 20, 1981
INVENTOR(S) : Donald L. Miller

It is certified that error appears in the above-identified patent and that said Letters Patent is hereby corrected as shown below:

Column 2, line 66, after "that" insert --- in ---.

Column 3, line 15, delete "in" and insert --- is ---.

Column 3, line 24, delete "pellets" and insert --- pellet ---.

Signed and Sealed this

Twenty-second Day of March 1983

[SEAL]

Attest:

GERALD J. MOSSINGHOFF

Attesting Officer    Commissioner of Patents and Trademarks